July 1, 1930.  C. E. RANSOM  1,768,996
SAW GRINDER
Filed July 13, 1925  2 Sheets-Sheet 1
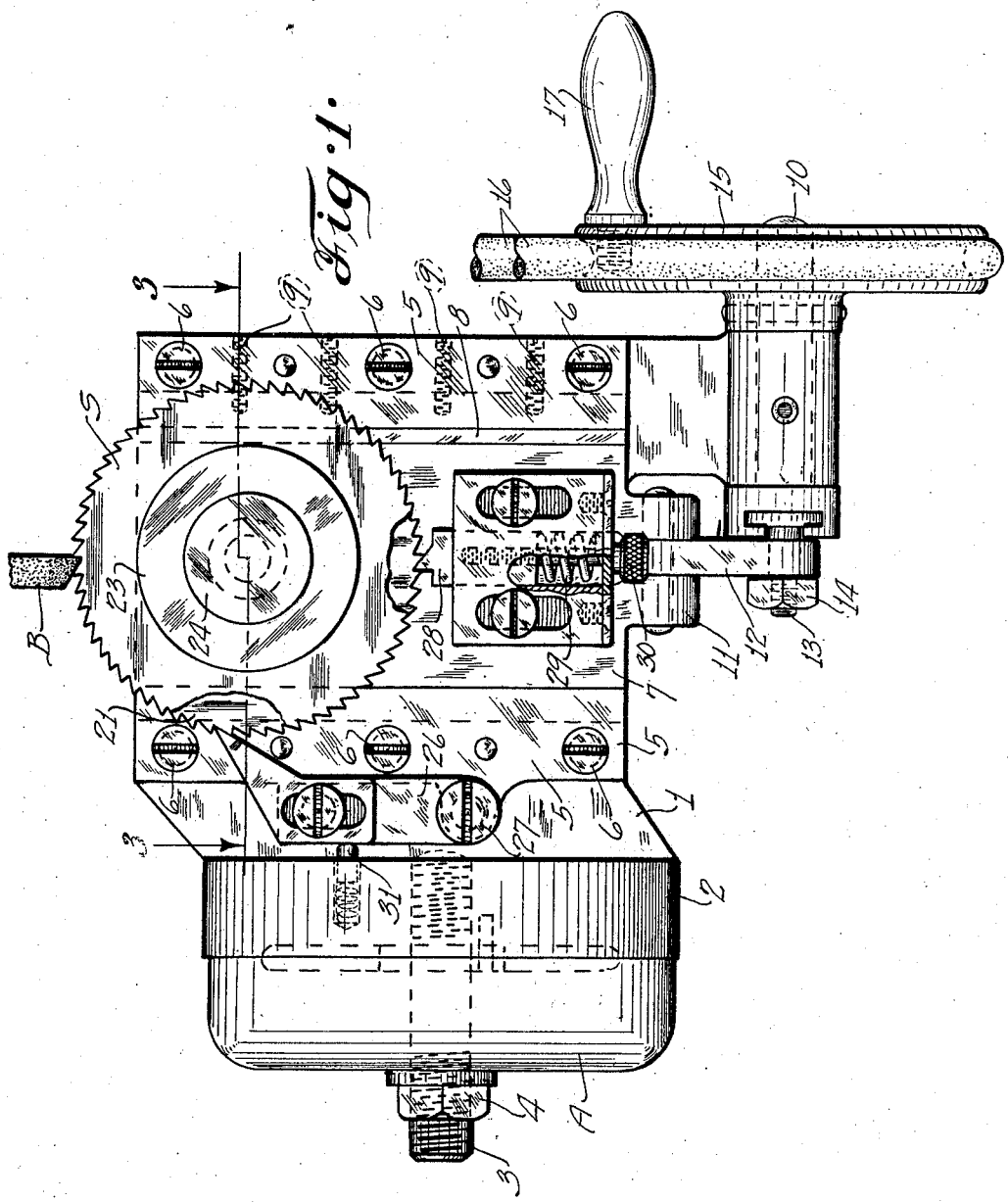
INVENTOR
Charles E. Ransom.
BY Cornwall, Bedell & James
ATTORNEYS July 1, 1930.  C. E. RANSOM  1,768,996
SAW GRINDER
Filed July 13, 1925  2 Sheets-Sheet 2
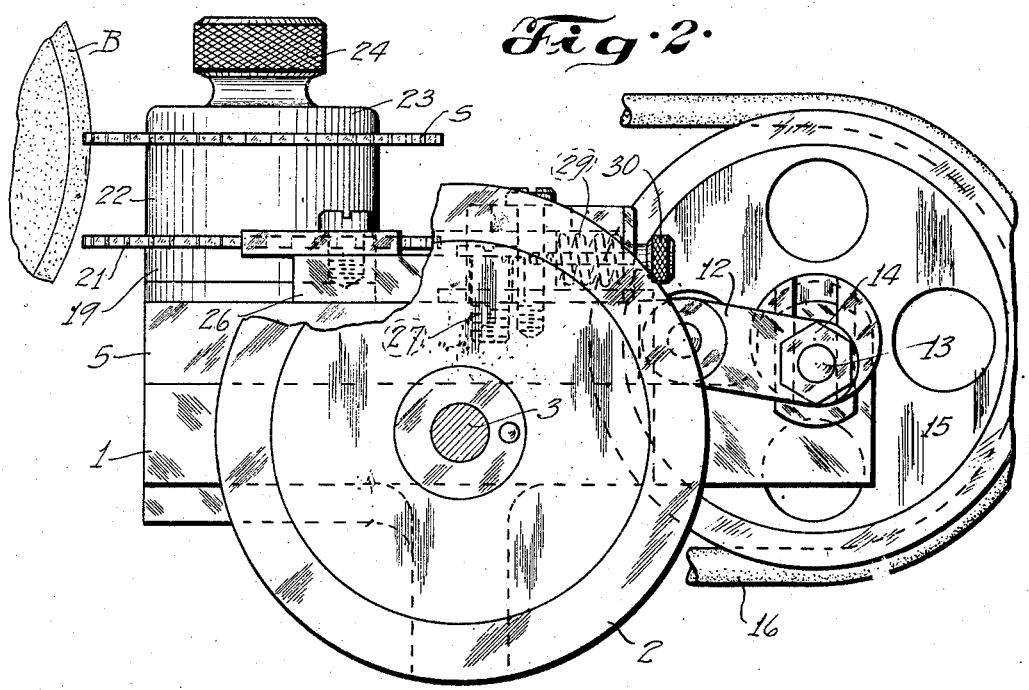
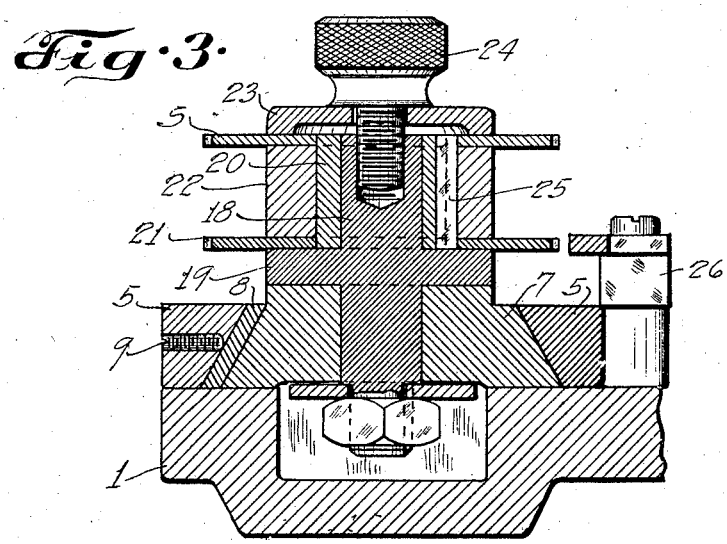
INVENTOR
Charles E. Ransom.
BY Cornwall, Bedell & James
ATTORNEYS Patented July 1, 1930

1,768,996

UNITED STATES PATENT OFFICE

CHARLES EMMET RANSOM, OF ST. LOUIS, MISSOURI

SAW GRINDER

Application filed July 13, 1925. Serial No. 43,181.

My invention relates to tools for grinding saws and consists in an improved mechanism for feeding the saw to a grinding wheel and withdrawing the same therefrom and for changing the tooth presented to the saw in the intervals between contact of the saw teeth with the grinding wheel.

The main object of my invention is to provide a tool by which the saw can be accurately presented to the grinding wheel and by which different teeth may be placed in contact with the grinding wheel for substantially the same period of time and with the same pressure.

An additional object of my invention is to provide a circular saw grinding tool with such adjustable elements that different sizes of saws may be accommodated.

Another object of my invention is to adapt a tool of this type to be operated by hand or mechanically from the grinding machine.

In the accompanying drawings which illustrate a selected embodiment of my invention adapted for uniformly grinding the teeth of small circular saws,—

Figure 1 is a top view of my device showing the same applied to the tool attaching bracket of the grinding machine and indicating the edge of the grinding wheel.

Figure 2 is a side elevation viewing the device from the lefthand side of Figure 1.

Figure 3 is a vertical section taken on line 3—3 of Figure 1.

In the drawings, the tool attaching bracket of the grinding machine is indicated at A and the grinding wheel at B. The body of my tool comprises a base 1, upon which the operating mechanism is mounted, and an upstanding flange 2, the outside face of which is finished for accurate application to the bracket A of the grinding machine. A threaded stud 3 extends outwardly from flange 2 to project through a suitable opening in bracket A and provide for the clamping of the tool to the bracket by means of a nut 4. Guides 5 are attached to the base 1 by means of screws 6 and cooperate therewith in forming slide-ways for a slide 7 which may be reciprocated to and from the grinding wheel B. I show one of the guides 5 as provided with a gib 8 which may be adjusted by means of the screws 9.

The slide 7 is reciprocated in its slide-way by a crank shaft 10 which is connected to projecting ears 11 on slide 7 by a link 12. The amount of offset of the crank pin is adjustable by means of the slide bolt indicated at 13 which may be locked in desired position by the nut 14. Shaft 10 is shown as equipped with a pulley 15 whereby the shaft may be rotated by means of a belt 16 which is driven by the grinding wheel shaft or any other rotating part of the grinding machine.

It is quite practical and, in some cases, may be preferable to rotate crank 10 manually by means of the handle 17 which is provided on pulley 15. The forward end of slide 7 mounts a stud 18 which forms a carrier for the saw to be sharpened. Stud 18 has an annular flange 19 and the upper portion of this stud is surrounded by a sleeve 20 over which a master saw or ratchet 21 may be slipped, the same resting upon flange 19 and being centered by sleeve 20. A collar 22 fits over sleeve 20 and forms a support for the saw S which is to be sharpened, the sleeve 20 projecting far enough above collar 22 so as to center the saw with the stud.

A washer 23 and a screw 24 threaded into stud 18 form means for detachably clamping sleeve 20, collar 22, ratchet 21, and saw S to stud 18. I also prefer to lock the parts together by means of a key 25, thereby insuring that saw S will rotate in unison with ratchet 21.

Obviously, when pulley 15 is rotated, slide 7 will be reciprocated toward and away from the grinding wheel B and the saw will be moved to and from the grinding wheel. A pawl 26 is pivoted at 27 on one of the guides 5 and the tooth of the pawl engages the periphery of ratchet 21 tangentially of the latter so that when slide 7 is moved away from the grinding wheel B, the ratchet will be rotated in a clockwise direction so as to rotate the same and present a different tooth to the grinding wheel when the same is again moved forwardly. Pawl 26 is yieldingly held in engagement with ratchet 21 by means of a spring-pressed plunger 31. A checking and locking pawl is indicated at 28 as extending radially of ratchet 21. Pawl 28 is pressed into engagement with the ratchet by means of a spring 29. The ratchet may be freed temporarily from pressure of pawl 28 by pulling outwardly on screw 30.

The tooth of pawl 26 is adjustably mounted on the body of the pawl and the housing for pawl 28 is adjustably mounted upon slide 7 so that the positions of these pawls may be varied to accommodate saws of different diameter than the one shown in the drawing. The removable sleeve 20, collar 22, and ratchet 21 provide suitable means for mounting different ratchets and saws with different diameters of centrol opening on stud 18.

In the operation of my machine, the rotation of pulley 15 at a fair rate of speed moves successive saw teeth the same distance toward grinding wheel B and withdraws them after a brief contact with the wheel, the extent of which is the same for each tooth. This is substantially true even though the device be operated by hand, as the operator's rotation of pulley 15 will be fairly uniform. Manual operation of the tool permits easy variation of the time of contact of the saw teeth and grinding wheel as may be desired in grinding different sized saws.

The saw illustrated in the drawings is of a type in general use on milling machines and so far as I am aware it has not been the practice heretofore to grind the teeth of these saws because of the difficulty in providing uniform grinding thereof. Grinding wheels necessarily rotate at a high speed and at 3250 revolutions per minute a six inch wheel has a peripheral speed of approximately 5000 feet a minute and it will be obvious that a slight variation in the pressure of such a wheel against a small saw tooth or a slight variation in the time which said tooth is in contact with the wheel will materially vary the contours of the different teeth so as to render them unfit for accurate and smooth milling operations. The saws are purchased from the manufacturer with the teeth having machined surfaces and after the points of the teeth have become once dulled, it has been the practice to discard the same and purchase new ones. With my improved tool, the dulled saw may be quickly replaced in condition for use and are actually sharper than the new saws having unground teeth.

I show the saw as being rotated by means of the master saw or ratchet 21 rather than by direct engagement of the teeth of the saw S being sharpened because occasionally one or more teeth of the saw S may be broken or so mutilated that the tooth of ratchet 26 would fail to engage and continue the rotation of the saw. The provision of a master saw or ratchet insures accurate rotation of the saw S irrespective of any defects in its teeth. My device could be somewhat simplified by having ratchets 26 and 28 engage teeth of saw S, thereby eliminating ratchet 21. While this is not as desirable construction as that illustrated, I contemplate this and other such modifications of my invention as may be suggested in its commercial development which are included in my claims.

I claim:

1. In a saw grinder, a base, a member mounted to reciprocate on said base, a saw mounting element freely rotatable on said member, a ratchet wheel secured to said element, a pawl having a stationary pivot on said base and engaging said ratchet wheel, a check pawl mounted on said member and engaging said ratchet wheel, and means for reciprocating said member on said base.

2. In a saw grinder, a slide, a saw carrier thereon, a ratchet on said carrier distinct from a saw mounted on said carrier, an adjustable pawl for said ratchet having a stationary pivot and arranged to engage the ratchet tangentially, an adjustable checking pawl for said ratchet disposed radially thereof and movable therewith and slidable radially thereof when said ratchet is rotated, and means for reciprocating said slide, said means and pawls cooperating to rotate said ratchet and carrier with alternate movements of said slide.

3. In a saw grinder, a reciprocable slide, a stud thereon, a removable collar on said stud adapted to secure a plurality of duplicate circular saws spaced from each other axially of the collar, and adjustable stationary means for engaging one of such saws when said slide is reciprocated to rotate another of such saws.

In testimony whereof I hereunto affix my signature this 3rd day of July, 1925.

CHARLES EMMET RANSOM.